United States Patent [19]

Bott

[11] 4,106,680

[45] Aug. 15, 1978

[54] VEHICLE ARTICLE CARRIER

[76] Inventor: John A. Bott, 931 Lakeshore Dr., Grosse Pointe Shores, Mich. 48236

[21] Appl. No.: 683,419

[22] Filed: May 5, 1976

[51] Int. Cl.² .............................................. B60R 9/00
[52] U.S. Cl. .................................. 224/29 R; 105/482; 224/42.1 R; 248/222.3; 280/179 R
[58] Field of Search ............ 224/5 H, 42.1 R, 42.1 D, 224/42.1 E, 42.1 G, 42.1 C, 29 R; 280/179 R, 179 A, 179 B; 105/473, 480, 481, 482, 483, 485; 248/222.3, 224.2, 225.1, 499

[56] References Cited

U.S. PATENT DOCUMENTS

| | | | |
|---|---|---|---|
| 2,859,710 | 11/1958 | Elsner | 248/222.3 X |
| 3,212,457 | 10/1965 | Looker | 280/179 R X |
| 3,235,219 | 2/1966 | Green | 248/222.3 X |
| 3,615,069 | 10/1971 | Bott | 224/42.1 D X |
| 3,623,642 | 11/1971 | Stephen | 224/42.1 E |
| 3,840,250 | 10/1974 | Bott | 280/179 R |
| 3,878,589 | 4/1975 | Schaefer | 224/5 H X |

Primary Examiner—Stephen G. Kunin
Assistant Examiner—Winston H. Douglas
Attorney, Agent, or Firm—Harness, Dickey & Pierce

[57] ABSTRACT

A carrier for luggage or the like which is mounted upon a generally planar portion of a vehicle body. The carrier comprises a plurality of separate load supporting slat assemblies which have upwardly facing grooves running lengthwise thereof. Disposed within selected of the grooves are retaining elements which cooperate with the grooves in securing article constraining members upon the upper surface of the slats. The retaining members are designed such that they may be inserted in a first position or orientation relative to the axis of the grooves and be rotated to a second position once they are disposed within the grooves to effect a locking of the load constraining members to the slat assemblies. Each of the slat assemblies is also provided with end caps at the opposite ends thereof which are formed with grooves similar in configuration to the grooves in the associated slats, whereby to permit additional load constraining members to be inserted onto the slat assemblies without requiring disassembly of the end caps, as has been necessitated in the past. Certain of the slat assemblies may be provided with load constraining bars or rails having molded plastic stanchions which cooperate with the retaining members in securing the rails in their respective operative positions upon the carrier.

18 Claims, 11 Drawing Figures

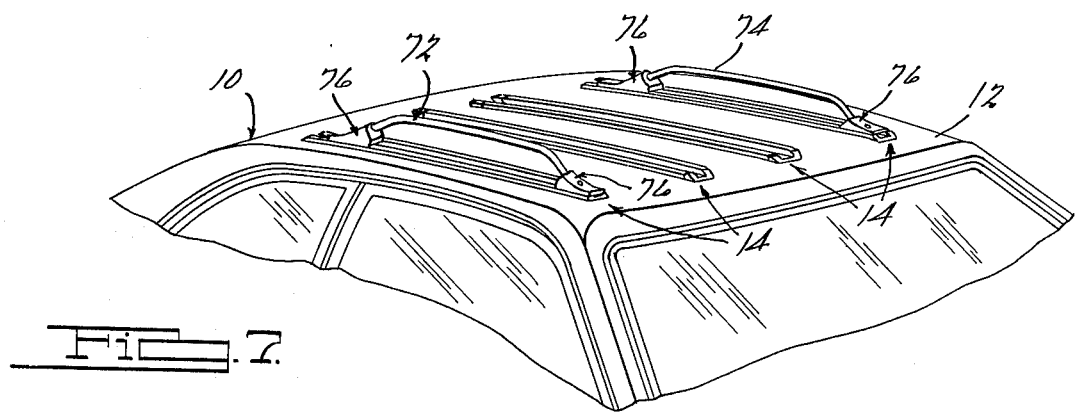
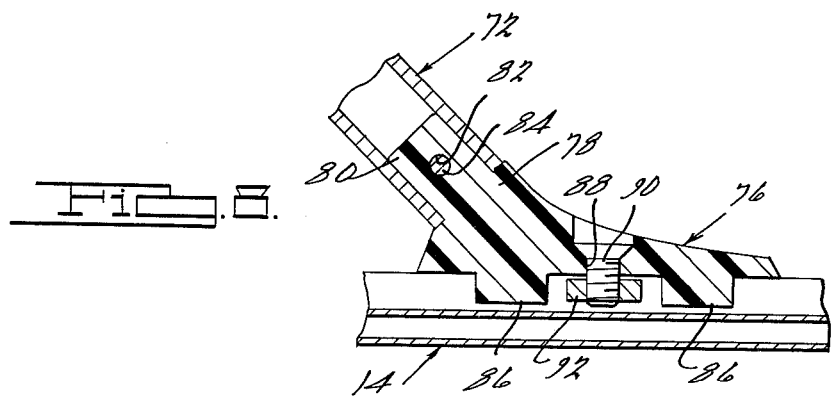
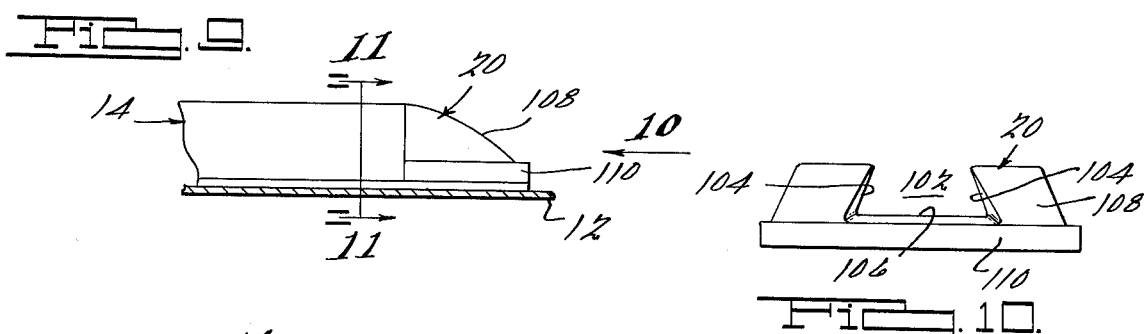
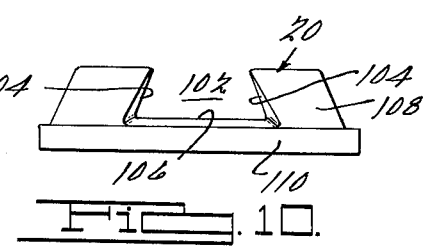
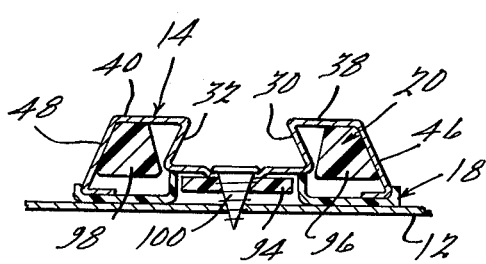

VEHICLE ARTICLE CARRIER

BACKGROUND OF THE INVENTION

The luggage carrier illustrated herein represents an improvement over the construction shown in the applicant's copending U.S. patent application Ser. No. 743,602, filed Nov. 22, 1976 which is a continuation of Ser. No. 486,415, filed July 8, 1974, and Ser. No. 604,644, filed Aug. 14, 1975 now U.S. Pat. No. 4,015,760. The carrier is attractive in appearance, relatively inexpensive to manufacture, strong and durable in construction, versatile in use and permits rapid assembly of various ancillary load constraining components thereon. The principal difference between the inventive concepts embodied in the subject luggage carrier and the carrier shown in the aforementioned prior filed applications resides in the means for securing such load constraining members to the respective slat assemblies and in the configuration of the end caps located at the opposite ends of the slat assemblies which permit convenient assembly of the load constraining members thereon.

SUMMARY OF THE INVENTION

The luggage carrier of the present invention utilizes a plurality of slats which are fabricated from roll-formed strips of sheet metal. Each of the slats has a pair of upwardly converging inner walls defining a groove therebetween which runs the length of the slat. The groove is adapted to receive and hold retaining elements for securing longitudinally adjustable load constraining members, such as tie-down members and/or stanchions for luggage constraining rails, and the like. The retaining members are designed such that they may be inserted in a first orientation into the grooves within the slats and be rotated by means of an associated threaded fastener element to a second position to achieve a positive locking action with the inner walls of the slat grooves. In addition, the slats are provided with end caps which are formed with grooves that are similar in shape to the grooves in the slats and permit convenient assembly of additional load constraining members on the slats without requiring disassembly of the end caps therefrom. The slats are intended to be operatively associated with load constraining bars or rails which are secured to the slats by means of stanchion members which are fabricated of a molded plastic material and which are intended to bear directly upon the upper surface of the slats.

BRIEF DESCRIPTION OF THE DRAWINGS

FIG. 7 is an elevated perspective view of another embodiment of the vehicle article carrier of the present invention;

FIG. 8 is an enlarged fragmentary cross-sectional view of one of the support stanchions embodied in the article carrier shown in FIG. 7;

FIG. 9 is an enlarged fragmentary side elevational view of one of the end caps incorporated in the article carrier shown in FIG. 7;

FIG. 10 is an end elevational view of the end cap shown in FIG. 9, as seen in the direction of the arrow 10 thereof; and FIG. 11 is a transverse cross-sectional view taken substantially along the line 11—11 of FIG. 9.

DESCRIPTION OF THE PREFERRED EMBODIMENTS

Figure 1:
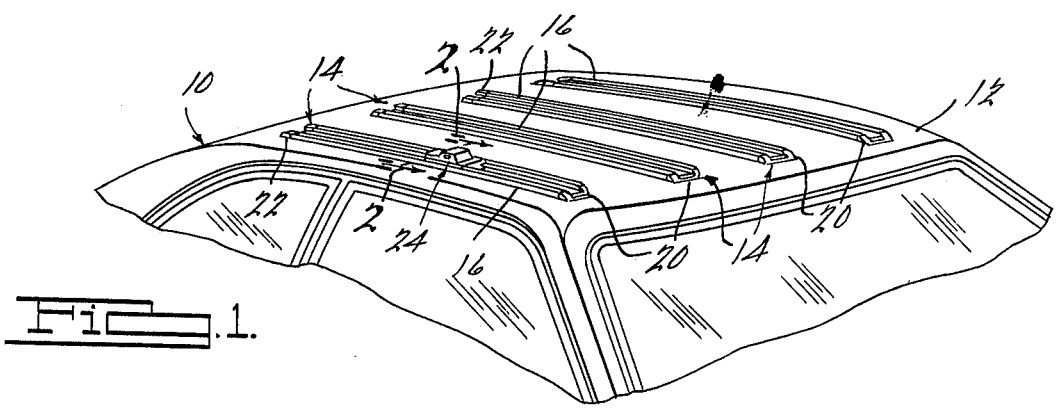
FIG. 1 is an elevated perspective view of one preferred embodiment of the vehicle article carrier of the present invention.

Referring now in detail to the drawings and in particular to FIGS. 1-6 thereof, a portion of an automotive vehicle 10 is shown as comprising a roof 12 which is disposed in a generally horizontal attitude or plane. Mounted upon the roof 12 is a plurality of laterally spaced parallel slat assemblies, generally designated by the numeral 14, which extend longitudinally of the vehicle 10. The slat assemblies 14, while being separate from one another and being connected only through the vehicle roof 12, cooperate in a manner so as to constitute the luggage carrier of the present invention.

Each of the slat assemblies 14 includes a slat 16 which is fabricated, for example, from a roll-formed strip of sheet metal material, such as stainless steel. Each of the slats 16 is adapted to rest to bear upon the upper side of an elongated mounting pad fabricated, for example, of an extruded relatively soft plastic material and generally designated by the numeral 18. Although not shown herein, each of the slats 16 may be provided on the upper side thereof with an elongated strip of relatively deformable material which provides a bearing surface for articles carried by the assemblies 14, as is shown and described in U.S. Pat. application Ser. No. 604,644, filed Aug. 14, 1975, the contents of which are incorporated by reference in this specification. Each of the slat assemblies 14 is also provided with a pair of end caps 20 and 22, and selected of the assemblies 14 may be provided with load constraining members 24, the details of which are hereinafter to be described.

While a variety of different types of articles may be transported on the luggage carrier of the present invention, a typical use thereof may be for carrying luggage, boxes or the like upon the roof of the vehicle 10, in which case the load constraining members 24 may be in the form of tie-down members having a body 26 providing a tie-down opening or eye 28 which cooperates with a suitable constraining member, such as a rope or the like (not shown) in securing the luggage, box, etc., upon the slat assemblies 14.

Figure 2:
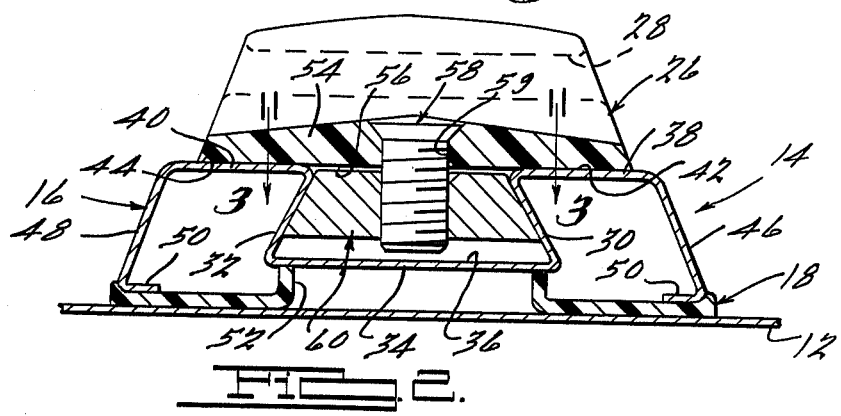
FIG. 2 is an enlarged transverse cross-sectional view taken substantially along the line 2—2 of FIG. 1.

The cross-sectional shape of each of the slats 16 is best seen in FIG. 2 wherein a typical slat 16 is shown as having a pair of upwardly planar inner walls 30 and 32 which are joined at their lower ends by means of a connecting web portion 34. The walls 30, 32 and web portion 34 together define an upwardly open, generally dove-tail shaped groove 36 which extends longitudinally along the center of the upper side of each of the slats 16. Extending horizontally outwardly from the upper ends of the inner walls 30, 32 are a pair of generally horizontally disposed supporting walls 38 and 40 which define generally horizontal surfaces 42 and 44, respectively. The upper walls 38, 40 are connected at their outer sides to upstanding outer walls 46, 48, the lower ends of which have their marginal edges turned inwardly to form supporting ledges, generally designated by the numeral 50. As best seen in FIG. 2, the mounting pad 18 of each of the slat assemblies 14 is provided with a raised center portion 52 which is adapted for engagement with the underside of the web portion 34, with the result that both of the ledges 50 and the web portion 34 are fully supported by the mounting pad 18 of each of the assemblies 14 for transferring any load applied to the slats 16 directly to the vehicle roof 12. Each of the slats 16 and their associated mounting pads 18 is secured to the vehicle roof 12 by means of suitable screws, bolts or the like (not shown) which extend downwardly through the web portions 34 thereof. Such openings may be appropriately countersunk such that the heads or head portions thereof are sufficiently recessed so as to not interfere with portions of the slat assemblies which slide longitudinally within the grooves 36, as shown in copending application, Ser. No. 604,644.

Figure 6:
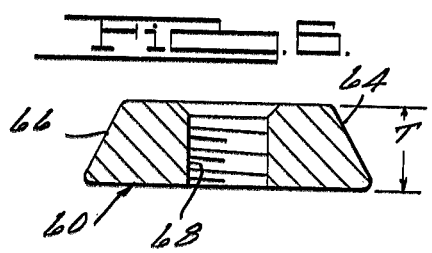
FIG. 6 is a transverse cross-sectional view taken substantially along the line 6—6 of FIG. 5.

As illustrated in FIGS. 1 and 2, the load-constraining members 24 are provided with longitudinally outwardly extending base portions 54 on the opposite sides thereof, the underside of which define a generally horizontally disposed surface 56 which is adapted to bear and be supported upon the surfaces 42, 44 of the associated slat 16. One or both of the base portions 54 of the members 44 may be provided with a downwardly extending fastening element, such as a screw, bolt or the like 58, which projects through an associated countersunk bore 59. In accordance with the principles of the present invention, the fastening member 58 is adapted to be operatively connected to a retaining element, generally designated by the numeral 60 and illustrated in FIGS. 3–6 which is located within the associated groove 36. Each retaining element 60 includes a body 62 having a pair of arcuate camming surfaces 64 and 66 which, as shown in FIG. 6, are inclined upwardly and inwardly at approximately the same angle as the walls 30, 32 of the slat 14. The body 62 is formed with a central bore which is preferably, although not necessarily, threaded and adapted to threadably receive the fastening element or screw 58 as shown herein. The thickness of the body 62 is designated by the letter "T" in FIG. 6 and is preferably less than the depth of the groove 36 of the slat 16. The length of the body 62 is designated by the letter "L" in FIG. 4 and is greater than the distance between the upper ends of the walls 30, 32, but less than the spacing between the lower ends of the walls 30, 32. The width of the body 62 is designated by the letter "W" in FIG. 5 and is designed to be slightly less than the spacing between the upper ends of the walls 30, 32, as best shown in FIG. 4.

Figure 3:
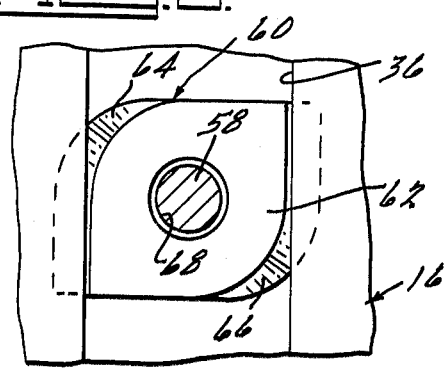
FIG. 3 is an enlarged fragmentary cross-sectional view taken substantially along the line 3—3 of FIG. 2.
Figure 4:
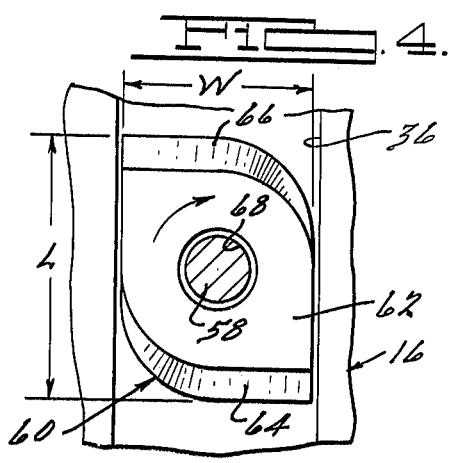
FIG. 4 is an enlarged fragmentary cross-sectional view similar to FIG. 3 and illustrates the retaining element therein in the position such element would assume when being inserted into the associated slat groove.
Figure 5:
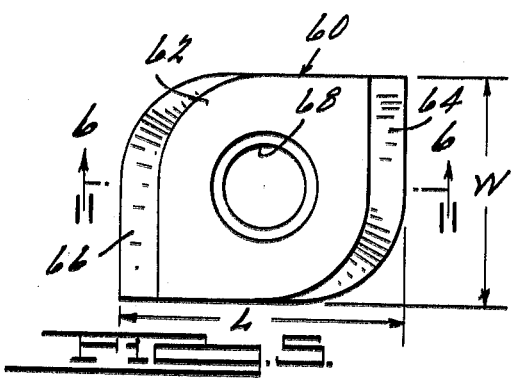
FIG. 5 is a top elevational view of the retaining element shown in FIGS. 3 and 4.

In operation of the retaining element 60, the body 62 is adapted to be initially inserted into the associated groove 36 in a first orientation, as indicated in FIG. 4, wherein the length L body 62 is arranged parallel to the longitudinal axis of the associated groove 36. The body 62 is then intended to be rotated or pivoted from the orientation shown in FIG. 4 to the orientation shown in FIG. 3, i.e., rotated approximately 90°, whereupon the camming surfaces 64, 66 are adapted for engagement with the side walls 30, 32 of the groove 36. At such time as the fastening element 68 is tightened, the body 62 will be moved upwardly to the position shown in FIG. 2 wherein the surfaces 64, 66 positively engage the interior surfaces of the walls 30, 32, whereupon the base portions 54 of the load constraining member 34 will be fixedly retained in engagement with the associated slat 16. It is to be noted that the threaded bore 68 and the fastening element 58 preferably have a frictional threaded fit, whereupon rotation of the fastening element 58 causes corresponding rotational movement of the retaining element 16, whereby to assure that the element 60 will move from the position shown in FIG. 4 to the locked or retaining position shown in FIG. 3 upon rotation of the fastening element 68. It will be seen that with the provision of the retaining element 60, the load constraining members 34 may be operatively installed within the associated slat assemblies 14 without requiring that the members 24 be inserted from the ends of the respective grooves 36. In other words, the load constraining members 24 may be operatively inserted at any longitudinal position along the associated slat assemblies 14, thereby providing for universality of application and expediting the time required to effect assembly of the members 24. At such time as it is desired to effect removal of the members 24, the fastening elements 58 merely need to be rotated approximately 90°, resulting in a corresponding rotational movement of 90° of the associated retaining elements 60, for example, from the position shown in FIG. 3 to the position shown in FIG. 4, whereupon the retaining elements 60 may be moved upwardly out of the associated grooves 36 to effect removal of the members 24. By virtue of the fact that the angle of the surfaces 64, 66 corresponds to the angle of the upwardly inclined walls 30, 32 of the grooves 36, a firm and positive engagement is achieved therebetween, whereby to assure against any relative movement of the retaining elements 60 with respect to the associated slats 16 upon assembly thereof.

It is to be noted that it is not necessary that the retaining element 60 be rotated the entire 90°, for example, from a position shown in FIG. 4 to the position shown in FIG. 3, in order to achieve proper locking of the associated member 24. Instead, by virtue of the arcuate shaped inclined surfaces 64, 66, it is only necessary that the element 60 be rotated a sufficient amount so that portions of the surfaces 64, 66 underlie portions of the side walls 30, 32, which results in a camming action occurring between the surfaces 64, 66 and the walls 30, 32 to effect proper locking of the load constraining members 26 upon tightening of the fastening element 58.

FIGS. 7–11 illustrate a modified embodiment of the present invention wherein the slat assemblies 14 are provided with load constraining members in the form of a pair of longitudinally extending side rails or bars 72 and 74 which are operatively secured to the laterally outermost of the slat assemblies 14 by means of support stanchions, generally designated by the numeral 76. As seen in FIG. 8, the stanchions 76 comprise upwardly projecting portions 78 that define cylindrical end portions 80 which are adapted to be operatively received within downwardly extending ends of the rails 72, 74 which, by way of example, are generally tubular in cross section and may be fabricated of stainless steel, or the like. The respective ends of the rails 72, 74 are adapted to be secured to end portions 80 of the stanchions 76 by having the rails 72, 74 provided with suitable diametrically extending bores or openings which align with openings 82 formed in the end portions 80 and adapted to receive suitable fastening elements such as screws, bolts or the like 84, as will be apparent to those skilled in the art.

Each of the stanchions 76 is provided with a lower or downwardly projecting guideway portion 86 which is adapted to be received within the associated groove 36 of the slat assembly 14 located therebelow. Extending downwardly through the stanchions 76 are suitable openings 88 adapted to receive fastening elements in the form of threaded screws, bolts or the like 90 which are cooperable with associated retaining elements 92 of the type hereinabove described in operatively securing the stanchions 76 and hence the side rails 72, 74 to the slat assemblies 14.

In accordance with another feature of the invention the stanchions 76 are adapted to be fabricated of a molded polymeric material, and such material may be selected so as to blend with or complement the decor of the associated vehicle and/or may be provided with a suitable exterior textured effect such as wood or leather graining, etc., as will be appreciated by those skilled in the art.

Referring now in detail to FIGS. 9-11, the end caps 20, 22 located at the opposite ends of the slat assemblies 14 are preferably identical in construction and the following description of the end cap 20 is intended to apply to all the end caps of the slide assemblies 14. As shown in FIGS. 9-11, the end cap(s) 20 is preferably fabricated of molded plastic material and includes a central tongue portion 94 which is adapted to be received within the end of the associated slat 16 at a position directly below the web portion 34 thereof. The end cap 20 also includes a pair of outer tongue portions 96, 98 which are adapted to project into the spaces between the inner and outer walls 30, 46 and 32, 48 and are preferably adapted to engage the inner surfaces of the outer walls 46, 48 to assure proper orientation of the end cap 20 relative to the associated slat 16. The respective end caps 20, 22 are adapted to be operatively secured to the associated slats 16 by means of suitable screws or the like 100 which extend downwardly through openings in the associated slat web portion 12 and the central tongue portion 94 into the associated roof 12, whereby to assure against disassembly of the end caps 20, 22 from the slat assemblies 14.

In accordance with the principles of the present invention, each of the end caps 20, 22 is formed with a central groove or slot 102 which is defined by upwardly and inwardly converging side walls 104 and a bottom wall 106, as best seen in FIG. 10. The walls 104, 106 are adapted to be longitudinally aligned with the walls 30, 32 and 34 of the associated slat 16 upon operative assembly of the end caps 20, 22 thereon, with the result that the slots 102 provide a longitudinal extension of each of the grooves 36 to terminal ends of each slat assembly 14. Thus, each of the slat assemblies 14 is provided with a groove which extends the entire length thereof, whereby to permit convenient assembly of additional load constraining members in the form of tie-down bodies, luggage constraining rails, etc., at either end of the assemblies 14 and without requiring that the end caps be disassembled from the associated slats 16, as has been the case in the past, for example, as is shown in U.S. patent application Ser. No. 604,644.

In order to enhance the appearance of the slat assemblies 14, the outer ends of the end caps 20, 22 may be provided with an arcuate shaped outer surface 108 and with a base portion 110 which conform with the size and shape of the associated slats 16 in order to provide a smooth, pleasant appearance.

It will be seen from the foregoing that the present invention provides a novel vehicle article carrier which is intended to provide for extremely convenient mounting of the article or load constraining members thereof. In particular, the load constraining members may be operatively mounted directly at any longitudinal position along the respective slat assemblies 14 through the use of the retaining elements 60. Alternatively, through provision of the grooves or slots 102 provided in the end caps 20, 22, such load constraining members may be mounted onto the slats 16 at either end thereof without having to disassemble the slat assemblies 14. In addition, by having the load constraining stanchions 76 fabricated of a molded plastic material, the overall appearance of the article carrier may be significantly improved over comparable units in the prior art, while at the same time, improving the economies of production thereof.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

I claim:

1. In combination in a vehicle article carrier for mounting on a planar surface of a motor vehicle comprising at least one generally horizontally arranged article supporting slat having an upwardly opening slot extending longitudinally thereof, said slot being defined by a bottom wall and upwardly converging substantially flat side walls, a load constraining member on said slat having a fastening element extending between said member and the interior of said groove, and retaining element disposed within said groove and operatively connected to said fastening element, said retaining element having at least one upwardly inclined surface, said surface being inclined at substantially the same angle from the vertical axis extending through said slat as said upwardly converging side walls, said retaining element being rotatable between a first orientation permitting removal and insertion thereof through the top of said groove, and a second orientation wherein said surface operatively engages at least one of said sidewalls of said groove so as to exert a clamping action between said sidewalls and said load constraining member for fixedly attaching said load constraining member to said slat at any longitudinal position along said slat.

2. The invention as set forth in claim 1 which includes the plurality of generally parallel slat assemblies fabricated of a metal material.

3. The invention as set forth in claim 2 wherein each of said slat assemblies defines generally horizontally disposed upper surfaces, and wherein said load constraining member is supported upon one of said surfaces.

4. The invention as set forth in claim 2 wherein said fastening element is externally threaded and wherein said retaining element is formed with a threaded bore adapted for threaded engagement with said fastening element.

5. The invention as set forth in claim 4 wherein said fastening element extends downwardly from said load constraining member and is threadably engaged with said bore in said retaining element.

6. The invention as set forth in claim 2 wherein said retaining element is engageable with each of said side walls defining said groove for fixedly securing said load constraining member on said slat.

7. The invention as set forth in claim 6 wherein said retaining element is formed with a pair of upwardly inclined surfaces arranged at substantially the same angle from a vertical axis extending through said slat as the upwardly converging side walls of said slat.

8. The invention as set forth in claim 7 wherein said retaining element is of a width less than the transverse width of the upper end of said groove, and wherein said retaining element has a length which is greater than the transverse width of the upper end of said groove but less than the overall width of said groove.

9. The invention as set forth in claim 8 wherein said inclined surfaces of said retaining member are arcuately shaped.

10. The invention as set forth in claim 8 wherein the thickness of said retaining element is less than the overall depth of said slot.

11. The invention as set forth in claim 1 wherein said load constraining member comprises a stanchion for operatively supporting one end of a side rail extending longitudinally of said slat.

12. The invention as set forth in claim 11 wherein said stanchion is fabricated of a molded plastic material, and which includes one end portion operatively engaged with one end of said side rail.

13. The invention as set forth in claim 1 wherein at least one end of said slat is provided with an end cap having a groove generally longitudinally aligned with said slot in said slat.

14. The invention as set forth in claim 13 wherein said groove in said end cap is of substantially the same size and shape as said slot in said slat and is longitudinally aligned therewith.

15. The invention as set forth in claim 13 wherein said end cap is fabricated of a molded plastic material which is generally contoured so as to conform with the overall size and shape of said slat.

16. The invention as set forth in claim 1 which includes a plurality of generally parallel, spaced apart slotted slat assemblies, and wherein each end of each of said slat assemblies is provided with an end cap having a groove longitudinally aligned with the slot in the associated of said slat assemblies.

17. The invention as set forth in claim 1 wherein said fastening element and said retaining element are frictionally connected so as to enable said fastening element to move said retaining element between said first and second orientations.

18. The invention as set forth in claim 17 wherein said fastening element further cooperates with said retaining element to move said retaining element generally vertically into and out of clamping engagement with at least one of said side walls so as to fixedly attach said load constraining member to said slat.

* * * * *